Nov. 25, 1924.                                                    1,516,669
E. P. CARPER
CUTTER BAR AND GUARD FOR MOWING MACHINES OR THE LIKE
Filed Feb. 17, 1923
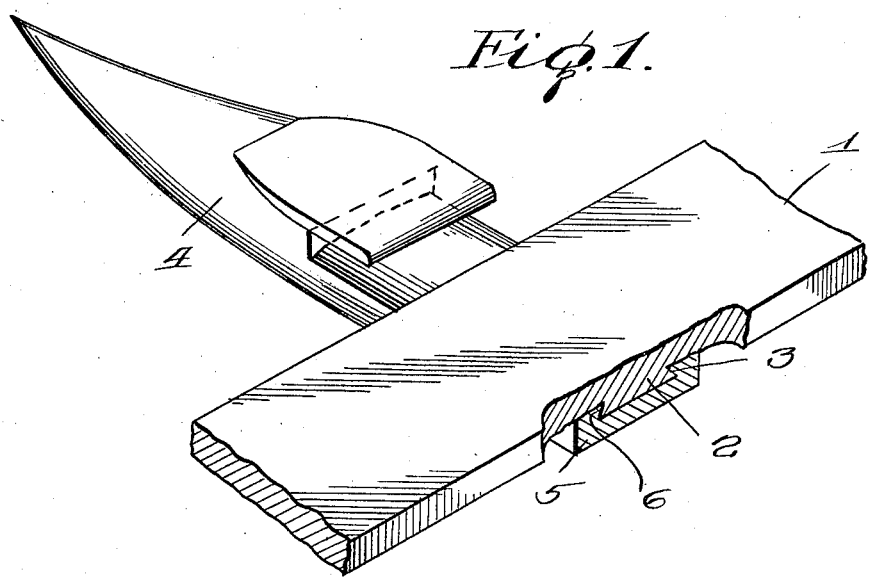
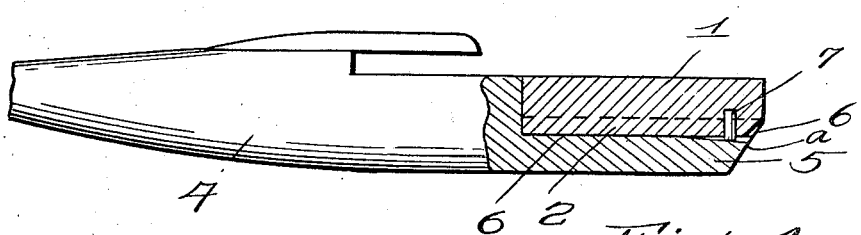
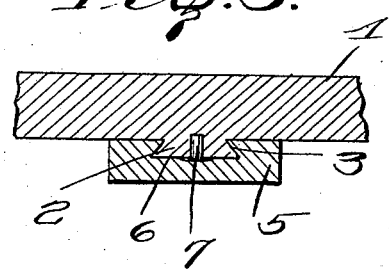 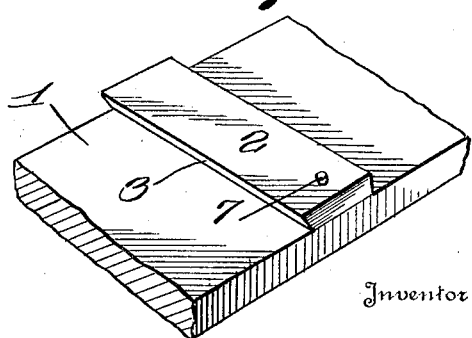
Inventor
Emmett Price Carper
By Watson E. Coleman
Attorney Patented Nov. 25, 1924.

1,516,669

UNITED STATES PATENT OFFICE.

EMMETT PRICE CARPER, OF FORDWICK, VIRGINIA.

CUTTER BAR AND GUARD FOR MOWING MACHINES OR THE LIKE.

Application filed February 17, 1923. Serial No. 619,749.

*To all whom it may concern:*

Be it known that I, EMMETT PRICE CARPER, a citizen of the United States, residing at Fordwick, in the county of Augusta and State of Virginia, have invented certain new and useful Improvements in Cutter Bars and Guards for Mowing Machines or the like, of which the following is a specification, reference being had to the accompanying drawings.

This invention relates to certain improvements in cutter bars and guards for mowing machines or the like and it is an object of the invention to provide novel and improved means whereby the guard may be applied or removed with convenience and facility and wherein the guard may be maintained in applied position without the use of bolts as now generally employed.

The invention consists in the details of construction and in the combination and arrangement of the several parts of my improved cutter bar and guard for mowing machines whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a fragmentary view in perspective illustrating a cutter bar and guard constructed in accordance with an embodiment of my invention and in applied position;

Figure 2 is a fragmentary view partly in side elevation and partly in section of the structure as illustrated in Figure 1;

Figure 3 is a transverse sectional view taken through the rear portion of the structure as illustrated in Figure 1, the inner lug being shown in elevation;

Figure 4 is a fragmentary view in perspective of the cutter bar in an inverted position.

As disclosed in the accompanying drawings, 1 denotes a portion of a cutter bar provided on its under surface at predetermined points spaced longitudinally thereof with depending ribs or beads 2 each of said beads or ribs 2 extending transversely of the bar 1 and entirely thereacross. The side or longitudinal walls of the rib or bead 2 are undercut as at 3 whereby said rib or bead 2 is in the form of a dovetailed tenon.

4 denotes the guard for the sickle (not shown) which is of conventional construction except that the shank 5 thereof which underlies the bar 1 is provided with a dovetailed groove or mortise 6 which snugly receives a rib or bead 2 hereinbefore referred to and whereby the guard 4 is operatively engaged with the bar 1.

The outer or end face of the rib or bead 2 adjacent the rear end thereof is provided with an outstanding spring lug or pin 7 which, when the guard is applied has frictional contact with the base wall of the groove or mortise whereby the guard 4 is effectively maintained in applied position.

In applying the guard 4 the same is effectively accomplished by a tap of a hammer or the like upon the outer end of said guard and by a similar impact on the shoulder of the shank 5, the guard 4 may be readily removed.

The outer portion of the base wall of the groove or mortise 6 is disposed on a slight incline to provide a cam surface *a* with which the spring, lug, or pin 7 has direct contact and whereby the application of the guard 4 is materially facilitated as is also true of the functioning of the pin, spring, or lug 7.

It is also to be particularly noted that the rib or bead 2 is outstanding with respect to the cutter bar 1. This is of particular importance as the guard of the bar 1 is materially reinforced thereby.

It has been fully demonstrated in practice that a cutter bar and guard constructed in accordance with the present embodiment of my invention the draft on the mowing machine or the like is materially lightened and that a guard can be readily replaced within a short period of time and with a minimum amount of labor and which is of particular advantage in the event a guard should break.

From the foregoing description it is thought to be obvious that a cutter bar and guard for mowing machines constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

In combination, a cutter bar provided on its under surface with an outstanding rib, a guard provided with a shank, said shank having a mortise to receive the rib, said rib and mortise being dovetailed, and a lug carried by the under face of the rib, said lug having frictional contact with the base wall of the mortise, the outer end of the base wall of said mortise being inclined to provide a cam surface with which the lug directly coacts.

In testimony whereof I hereunto affix my signature.

EMMETT PRICE CARPER.